United States Patent
Demi et al.

(10) Patent No.: US 8,820,724 B2
(45) Date of Patent: Sep. 2, 2014

(54) SPRING-MOUNTED VIBRATION SYSTEM TO REDUCE VIBRATION

(71) Applicant: Grammer AG, Amberg (DE)

(72) Inventors: Johann Demi, Thanstein (DE); Andreas Vogi, Teublitz (DE); Alexander Lorey, Maxhuette-Haidhof (DE)

(73) Assignee: Grammer AG, Amberg (DE)

( * ) Notice: Subject to any disclaimer, the term of this patent is extended or adjusted under 35 U.S.C. 154(b) by 59 days.

(21) Appl. No.: 13/627,503

(22) Filed: Sep. 26, 2012

(65) Prior Publication Data

US 2013/0020458 A1   Jan. 24, 2013

Related U.S. Application Data (62) Division of application No. 12/605,165, filed on Oct. 23, 2009, now Pat. No. 8,439,334.

(30) Foreign Application Priority Data

Oct. 23, 2008   (DE) .......................... 10 2008 052 960

(51) Int. Cl.
*F16F 5/00*   (2006.01)

(52) U.S. Cl.
USPC ..................... 267/140.11; 267/131; 248/588

(58) Field of Classification Search
USPC ........... 267/140.11, 131; 248/280.11, 292.11, 248/440.1, 564, 577, 588, 584
See application file for complete search history.

(56) References Cited

U.S. PATENT DOCUMENTS

| | | | | |
|---|---|---|---|---|
| 3,752,432 A | * | 8/1973 | Lowe | 248/564 |
| 4,729,539 A | * | 3/1988 | Nagata | 248/575 |
| 4,729,580 A | * | 3/1988 | Buma et al. | 280/5.513 |
| 4,733,847 A | * | 3/1988 | Grassl | 248/550 |
| 4,822,094 A | * | 4/1989 | Oldfather et al. | 296/65.02 |
| 4,946,145 A | * | 8/1990 | Kurabe | 267/131 |
| 5,058,852 A | * | 10/1991 | Meier et al. | 248/588 |
| 5,133,575 A | * | 7/1992 | Zantinge et al. | 280/6.159 |
| 2008/0197684 A1 | * | 8/2008 | Ott et al. | 297/344.16 |
| 2009/0134595 A1 | * | 5/2009 | Haller et al. | 280/124.157 |
| 2012/0049421 A1 | * | 3/2012 | Haller et al. | 267/33 |

FOREIGN PATENT DOCUMENTS

| | | | | |
|---|---|---|---|---|
| CN | 2309244 Y | * | 3/1999 | |
| DE | 452315 C | * | 11/1927 | |
| DE | 3242287 A1 | * | 5/1984 | |
| DE | 3517503 A1 | * | 11/1986 | |
| DE | 102004054325 B3 | * | 4/2006 | |
| GB | 2057260 A | * | 4/1981 | |
| KR | 20020090377 A | * | 12/2002 | |
| WO | WO-2005/102112 A | * | 11/2005 | |

* cited by examiner

*Primary Examiner* — Pamela Rodriguez (74) *Attorney, Agent, or Firm* — Lowe Graham Jones PLLC (57) ABSTRACT

Spring-mounted vibration system to reduce vibration with a first spring-mounted part and a second spring-mounted part, wherein the first spring-mounted part and the second spring-mounted part can oscillate relative to each in at least one vibration direction and at least one of the spring-mounted parts can be exposed to a return force on a vibration movement. A control unit is arranged with at least one travel linkage which is connected with at least one of the spring-mounted parts and in which is arranged displaceably at least one guide element connected with a spring element generating the return force and/or the other spring-mounted part.

6 Claims, 14 Drawing Sheets

SPRING-MOUNTED VIBRATION SYSTEM TO REDUCE VIBRATION

PRIORITY CLAIM

This application claims priority to U.S. application Ser. No. 12/605,165, filed on Oct. 23, 2009, now U.S. Pat. No. 8,439,334, and German Application Serial No. 10 2008 052 960.5 filed Oct. 23, 2008, contents of which are incorporated herein.

FIELD OF THE INVENTION

The invention related to a spring-mounted vibration system to reduce vibration with a first spring-mounted part and a second spring-mounted part, wherein the first spring-mounted part and the second spring-mounted part can oscillate in at least one vibration direction relative to each other and at least one of the spring-mounted parts can be exposed to a return force on a vibration movement.

BACKGROUND OF THE INVENTION

Spring-mounted vibration systems, in particular for vehicle seats, are known in many forms. For example, very often a pneumatic spring and in addition a gas damper element are arranged between two spring-mounted parts, namely, a lower part and an upper part on which the actual vehicle seat is mounted, in order to damp out the vibration movement which can be initiated both from above by the driver and from below from the vehicle chassis. Such spring-mounted vibration systems require complex control of the pneumatic spring and damper, and are therefore cost- and time-intensive to produce and maintain.

Such known spring-mounted vibration systems also have the disadvantage that after a certain time, they require repair and where applicable the pneumatic spring and/or the damper must be replaced.

Consequently, there is a need to provide a spring-mounted vibration system to reduce vibration, which is not only low-cost to produce but also is not time-intensive to maintain, and is simple to construct.

SUMMARY OF THE INVENTION

The present invention is directed to a spring-mounted vibration system to reduce vibration having a first spring-mounted part and a second spring-mounted part, wherein the first spring-mounted part and the second spring-mounted part can oscillate in at least one vibration direction relative to each other and at least one of the spring-mounted parts can be exposed to a return force on a vibration movement A control unit is arranged with at least one travel linkage which is connected to at least one of the spring-mounted parts and in which is displaceably arranged at least one guide element connected with a spring element generating the return force and/or the other spring-mounted part. Here the travel linkage can have different linkage forms. By suitable design of the linkage form of the travel linkage, depending on the vibration direction of the spring-mounted vibration system, advantageously not only can a reduction in the vibration movement be achieved depending on the momentary load of the spring-mounted vibration system, in particular from pulses introduced into the spring-mounted vibration system, but also a weight adaptation can be achieved such as for example is the case with a vehicle seat with a driver seated thereon. Consequently as a function of the linkage form of the travel linkage, a counter force is obtained that is different from the force introduced to generate the vibration, wherein the travel linkage automatically travels lengthways under the vibration movement.

The travel linkage can for example be formed curved in relation to the vibration direction. Here the guide element in the form of a guide peg runs inside the curved travel linkage which for example constitutes a slot or a groove within a plate or a similar component. The guide peg itself is connected with a spring element which generates the return force, wherein the spring element can be attached in a fixed location on one of the spring-mounted parts which at the same time contains or is connected to the curved travel linkage.

A further travel linkage can advantageously be arranged, wherein this is formed such that on a forward vibration movement, it has an almost linear first course section and a second course section rising with a gradient value in relation to the first course section. Further preferably such a travel linkage, for the transition from the forward vibration movement to a rearward vibration movement, has a falling third travel section, the gradient value of which as a second gradient value is greater than the first gradient value.

This travel linkage can also, for the rearward vibration movement, have an almost linear fourth course section and a fifth course section falling away in relation to the fourth course section with a first gradient value. For the transition from the rearward vibration movement to the forward vibration movement, the travel linkage preferably has a rising sixth course section, the gradient value of which corresponds to the second gradient value. A further travel linkage arranged in this manner allows the provision of a further guide element which runs therein on a predetermined linkage path in predetermined directions of the individual course sections as a function of the momentary vibration travel of the entire system, in order in interaction with the first travel linkage which is formed curved, by means of the guide elements connected together, to obtain a certain vibration reduction behaviour due to the targeted travel linkage guidance. This achieves that different spring forces act on the vibrating system as a function of the momentary vibration position of the vibration system.

Advantageously, for such a system no further pneumatic spring or damper is required between the two spring-mounted elements, for example an upper and a lower part of a vehicle seat.

Also the curved path of a travel linkage without further travel linkage can be arranged inside a spring-mounted part, wherein the guide element or guide peg is deflected within the curved path by means of a swivel arm which in turn is attached for example to a scissor-like frame that is extended or retracted to varying extents depending on the momentary vibration movement. In its swivel movement caused by the retraction and extension of the scissor-like frame, the swivel arm can be exposed to a return spring force at laterally arranged spring elements arranged on the left and right sides of the swivel arm, which force acts against the further swivel movement and hence contributes to a vibration reduction.

Such swivel systems are used primarily for vertically aligned vibration systems i.e. for example a driver's cab or a vehicle seat.

Also horizontally arranged vibration systems can be equipped with such travel linkages as could be required for example on a vehicle, in particular a tractor, in the driving direction or perpendicular to the driving direction. In principle all vibration systems can be coupled to or used with any type of scissor springing or parallelogram springing between the two spring-mounted parts, wherein the scissor springing or parallelogram springing between the two spring-mounted parts serves as a connecting element. Any other type of connecting element can be made available in connection with such travel linkages.

Horizontally aligned vibrations can undergo a vibration reduction with the vibration system according to the invention, in that for example a curved linkage is arranged in one of two lever arms mounted swivellably on the first guide part, wherein two guide elements allocated to the curved travel linkages are connected together by means of a connecting element. The connecting element is mounted sliding on a slide element.

Preferably the lever arms are spring-loaded by means of spring elements in the swivel direction influenced by the vibration direction. By such a construction, by swivelling the lever arms—which is achieved due to a horizontal vibration of the entire system—a displacement of the connecting element is achieved and the guide element attached thereto, which run within the linkages. This leads to the lever arms being placed in a different position to each other but dependent on each other because of the connecting element. As a result the lever arms are deflected against the spring force of the spring elements and a return force is applied because of the spring elements which are themselves preferably attached to the spring-mounted parts. Further spring elements such as for example a pneumatic spring or a damping element between the two spring-mounted parts, as was previously the case, are not required.

According to a preferred embodiment, the swivellable lever arms are connected with at least one damping element to damp their swivel movements. This damping element, like the aforementioned spring elements, can be arranged laterally or perpendicular to the lever arms and act with a counter force against the deflection of the lever arms in order as a result to apply a vibration reduction depending on the swivel movements of the lever arms. The swivel arms are again arranged in mutual dependency because of the connecting element.

The guide element arranged displaceably in the travel linkage interacts with at least one component reproducing the vibration movement, wherein for example this can be an inertia element. As a result, because of the time-delayed displacement of the inertia element, a delayed displacement of the guide element in the travel linkage takes place after initiation of the vibration movement in the entire system, and hence achieves a vibration damping or vibration reduction on short-time pulses. This can also mean that successive opposed vibrations do not lead to an over-vibration of the entire system as the inertia element can only be deflected with certain inertia.

BRIEF DESCRIPTION OF THE DRAWINGS

The advantages and applications arise from the description below in connection with the drawings. These show.

DETAILED DESCRIPTION OF THE PREFERRED EMBODIMENT

Figure 1:
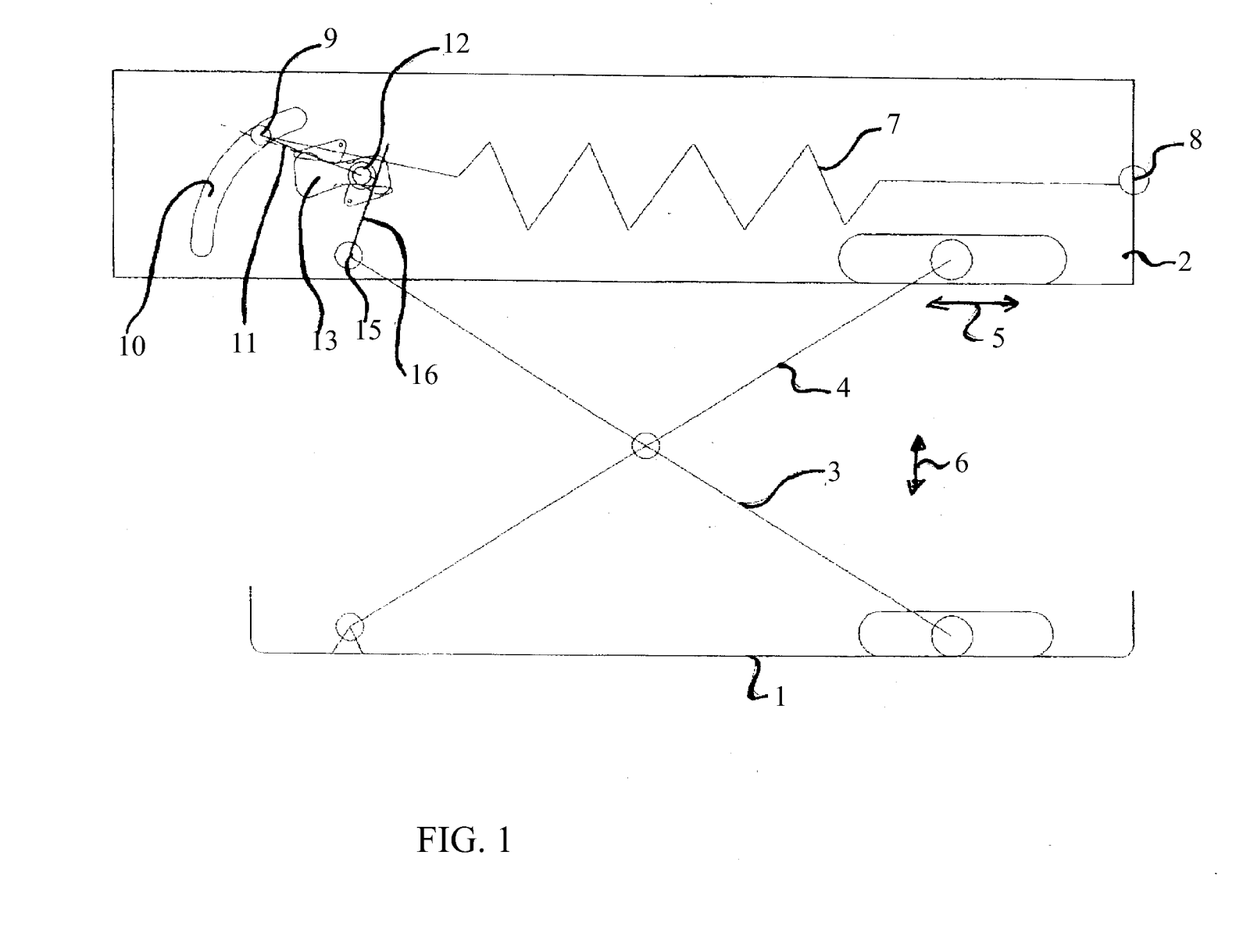
FIG. 1 in a diagrammatic side view, a spring-mounted vibration system according to a first embodiment of the invention.

FIG. 1 shows, in a diagrammatic side depiction, a lower section of a vehicle seat or a driver's cab of a vehicle, wherein the spring-mounted system is exposed to vibration in the vertical direction. A first vehicle seat lower part 1, or a body part 1 for the driver's cab, and a second vehicle seat upper part 2, or a cab part when used in a driver's cab, are connected together in an oscillatable manner by two scissor arms 3, 4. To perform the vibration in the direction 6, the scissor arms can be pushed by means of rollers or plain bearings in the horizontal direction 5.

A spring element 7 is arranged with a first end 8 at one end of the vehicle seat upper part 2 and with a second end inside the curved travel linkage 10 which is preferably formed as a groove, a guide peg 9 or guide element.

The guide peg 9 is firmly connected by means of a rod element 11 to a second guide peg 12 which in turn is arranged in a further travel linkage 13.

A lever arm 14 is deflected about a swivel point 15 by means of the scissor arm 3 which has differing gradients depending on the momentary vibration state.

FIGS. 2a-g show an extract of the spring-mounted vibration system according to the first embodiment of the invention as shown in FIG. 1. The section shown here in detail shows the curved linkage path 8 with the guide peg 9 arranged therein and the rod 11. The spring element 7 is also connected with the guide peg 9.

The travel linkage 13, for a forward vibration movement, has an almost linear first course section 18 and a second course section 19 rising with a first gradient value in relation to the first course section 18. Furthermore the travel linkage 13, along whose edge 17 runs the guide peg or guide roller 12, for the transition from the forward vibration movement to the rearward vibration movement, has a falling third course section 20, the gradient value of which as a second gradient value is greater than the first gradient value.

Figure 2A:
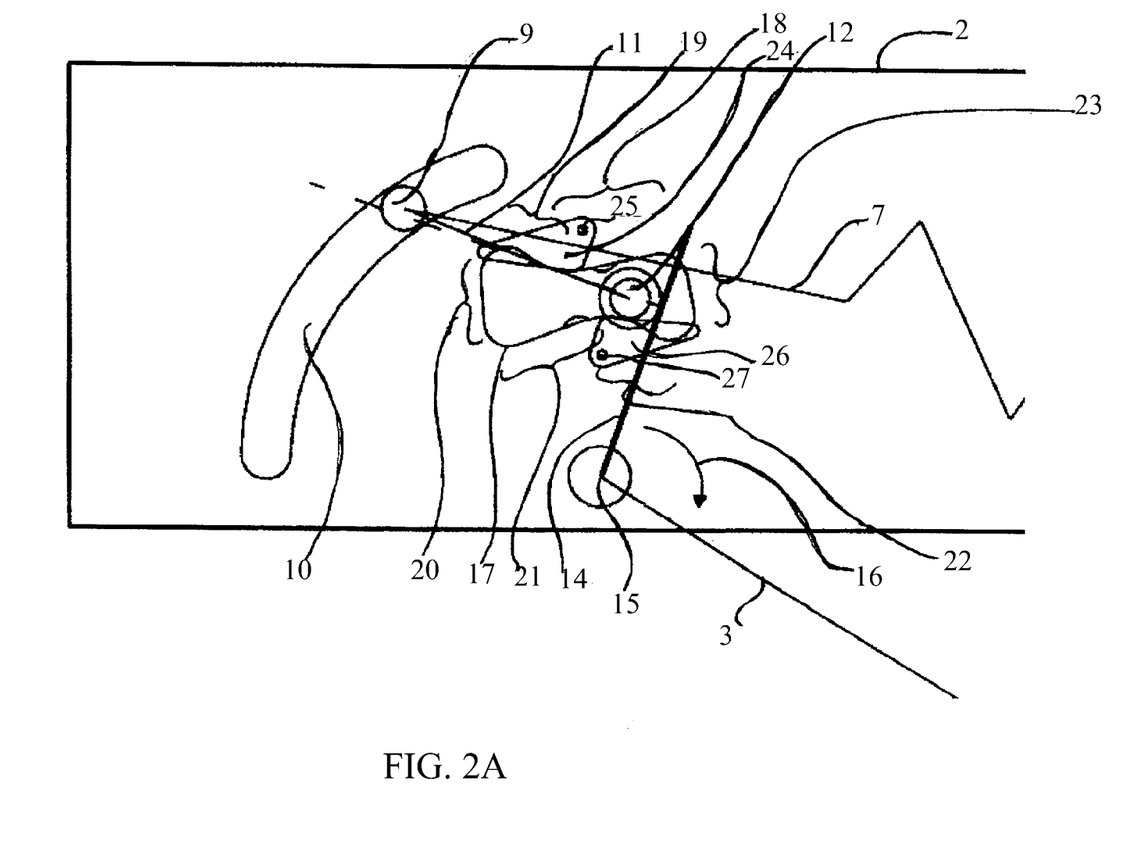
FIGS. 2a-g in an extract view, the travel linkage guidance of the spring-mounted vibration system according to the first embodiment of the invention.

In FIG. 2a, the lever arm 14 which is connected with the guide peg 12 and co-determines its deflection, swivels in the direction of arrow 16 because of the vibration movement.

Figure 2B:
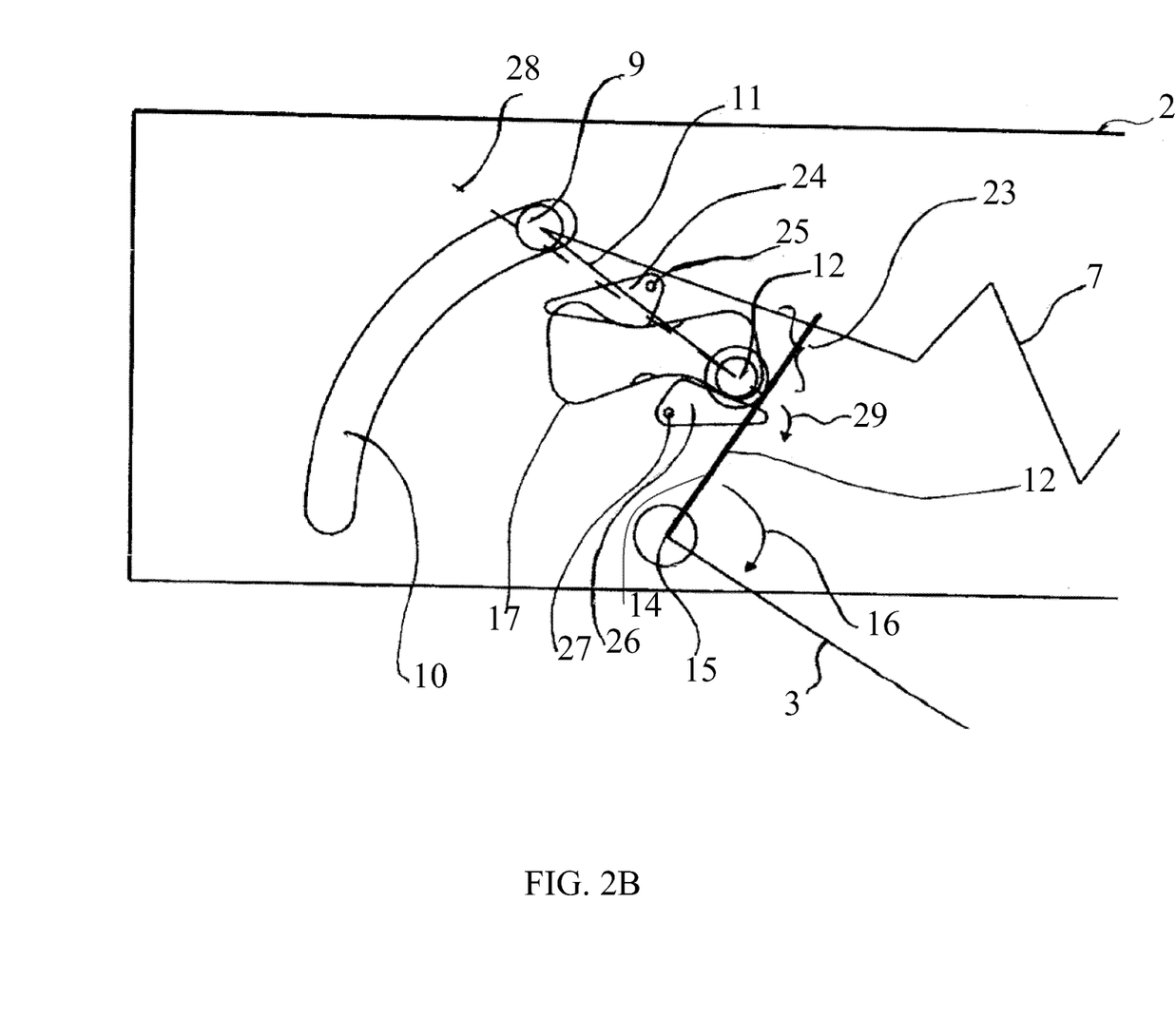

In FIG. 2b, the swivel arm 14 is swivelled further in the direction of arrow 16, deflecting a return catch 26 which can be swivelled about swivel point 27 and is preferably fitted with toothing and where applicable a spring loading. Also the guide peg 9 is moved slowly upwards within the curved linkage.

In FIG. 2b, the guide peg 12 is moved down along a fifth course section 22 falling away with the first gradient value, whereby the catch 26 can be deflected further.

Figure 2C:
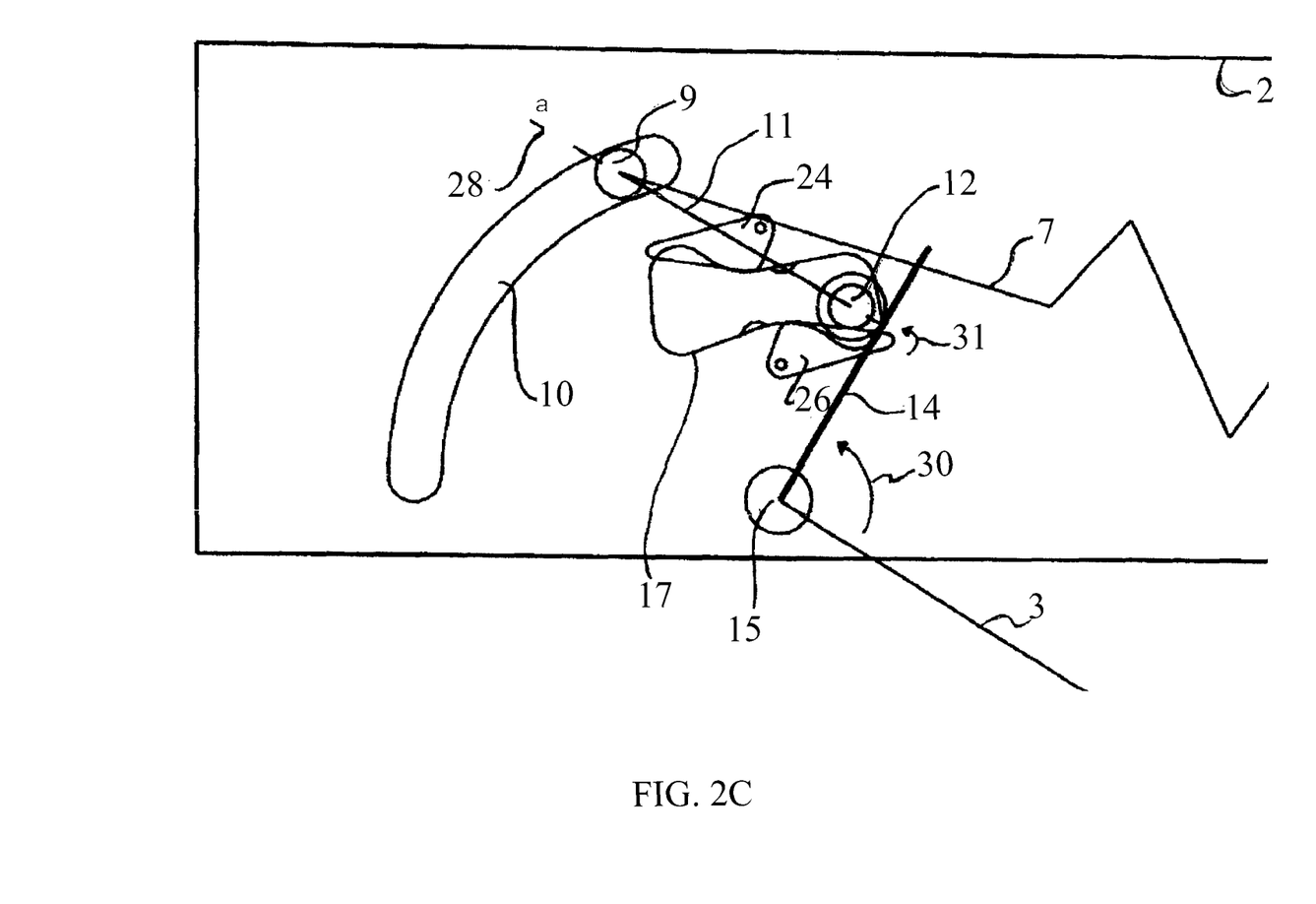

Then as shown in FIG. 2c, a rearward movement of the swivel arm 14 takes place as shown by reference numeral 30. At the same time the catch 26 is deflected upwards again according to reference numeral 31, and the guide peg 12 is moved upward along the sixth course section, the gradient value of which corresponds to the second gradient value.

Figure 2D:
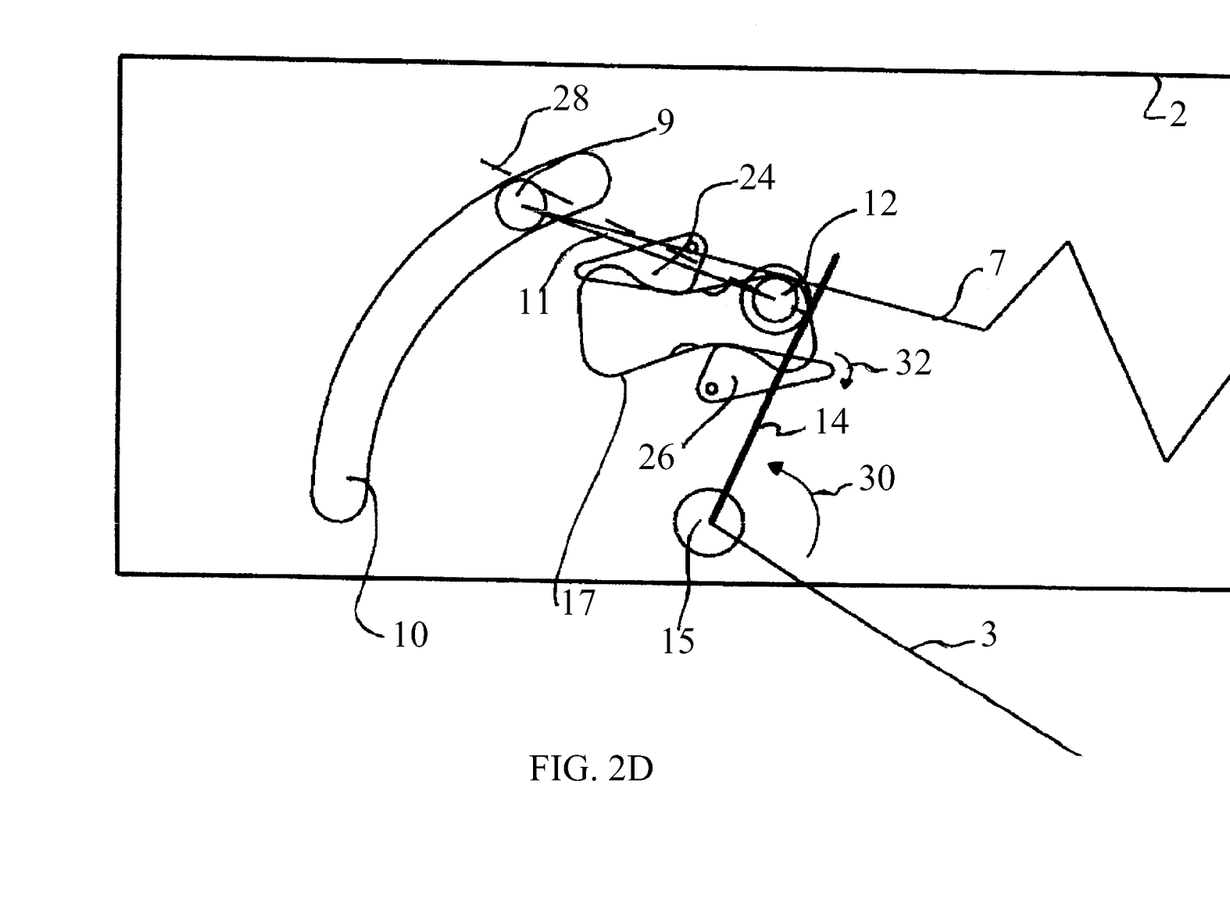

In FIG. 2d, a further movement of the swivel arm 14 takes place along the arrow 30 and a rearward swivel movement of the catch 26 along the arrow 32.

The guide peg 9 is now already on the downward directed path of the curved linkage 10, where it can be seen from the position in FIG. 2b of the guide peg 9 that it is at its maximum upward deflection within the linkage 10. As a result a change in the spring kinematics takes place over the entire spring travel of the springing affected in this manner, as depicted in the form of a desired spring curve according to FIG. 6.

Figure 2E:
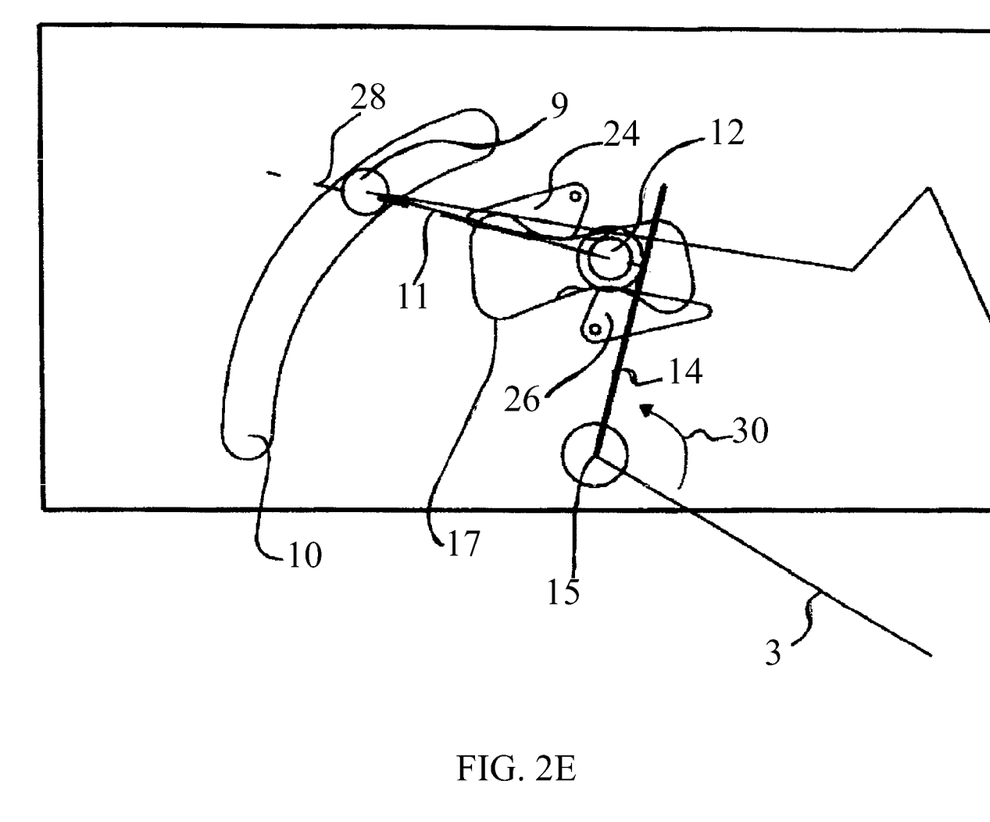

The guide peg 12, according to the transition from the position shown in FIG. 2d into a position shown in FIG. 2e, moves into a first course section 18 which runs almost linear. In this position of the guide peg 12, the guide peg 9 is already moved downward again along the curved linkage path 10. This corresponds to a switchover point which is in any case present according to the view in FIG. 2c, as in this case a lever perpendicular 28 and the direction of the deflected spring force of spring element 7 run in the same direction for a brief moment.

Figure 2F:
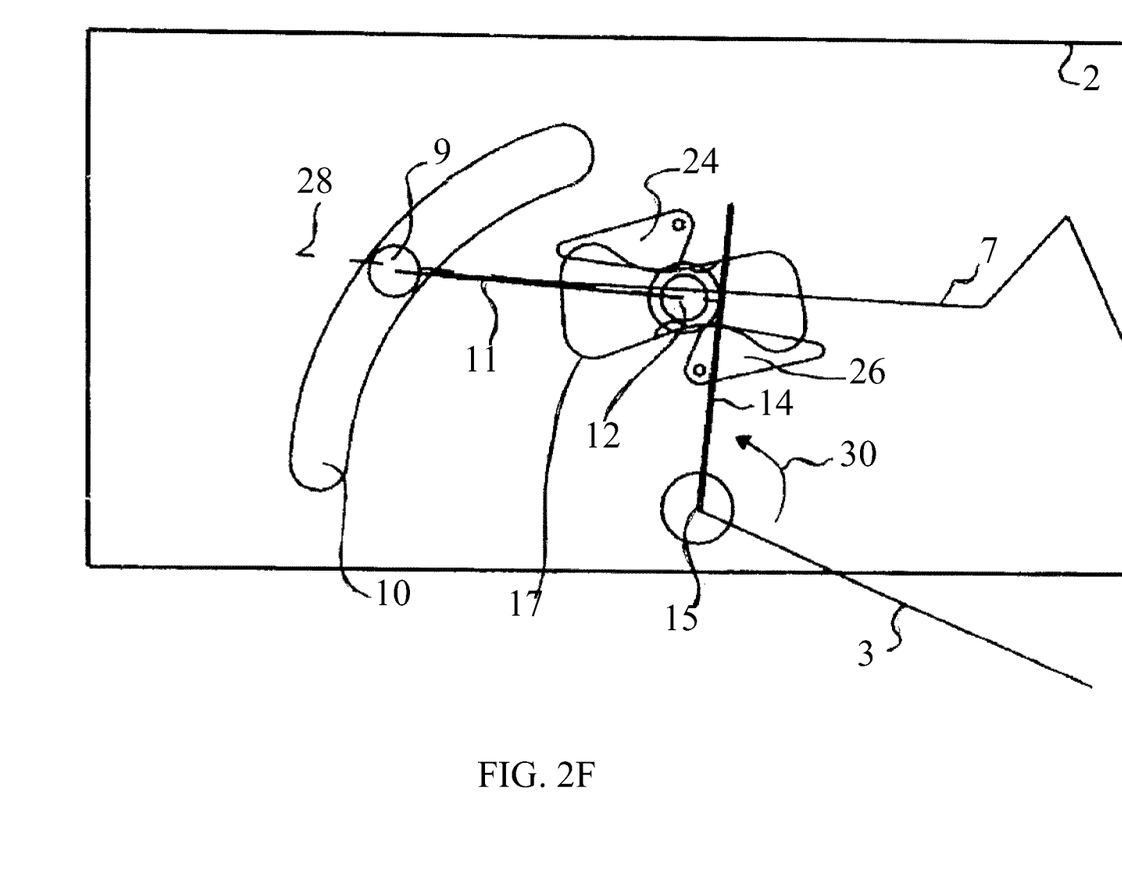
Figure 2G:
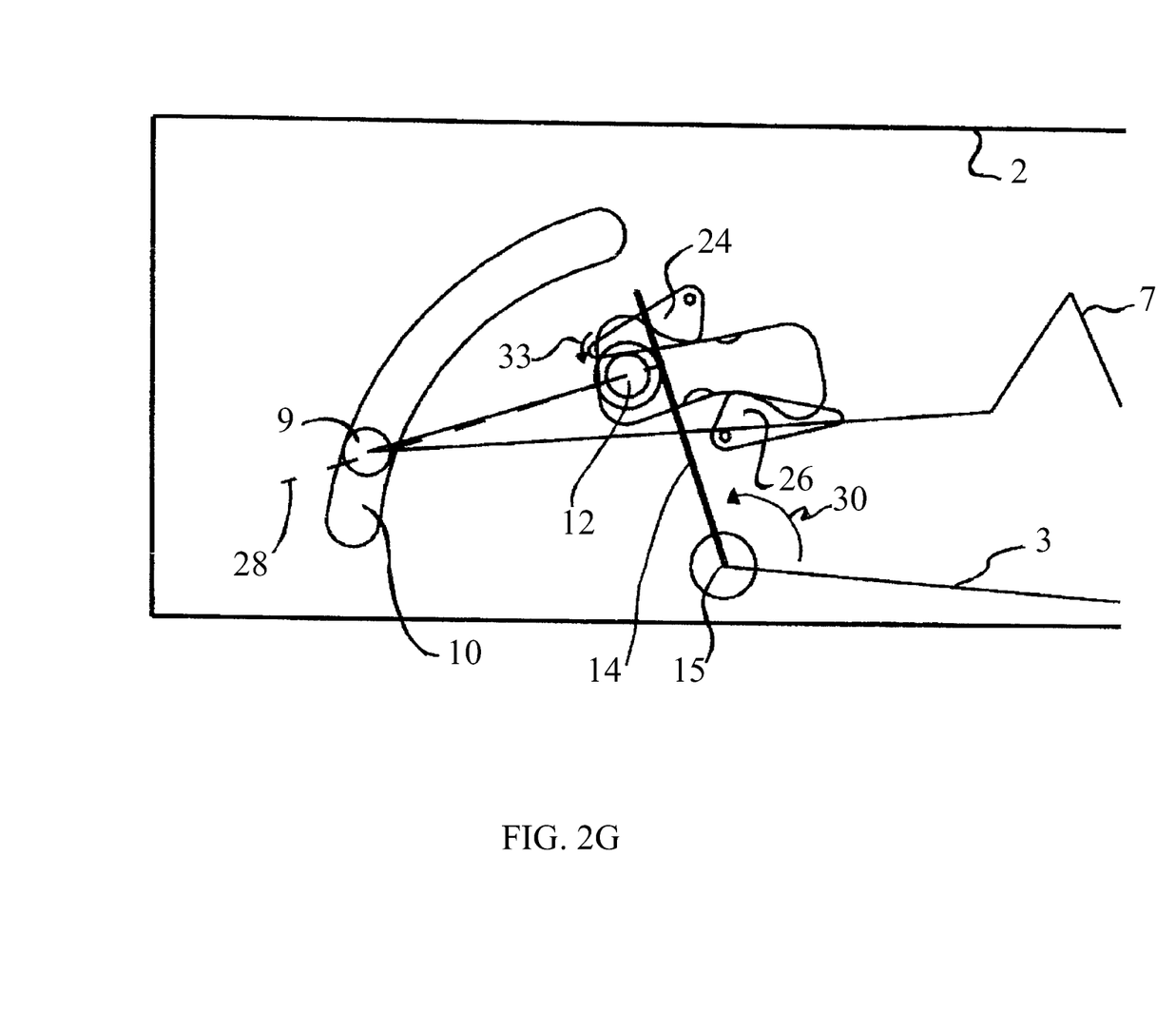

A further switchover point occurs in the depiction in FIG. 2f. Here too, the direction of the lever perpendicular 28 is shown in the same direction as the direction of the deflected spring 7. In this position the guide peg 12 is moved further to the left as shown also from FIG. 2d. A further catch 24 which can swivel about a swivel point 25 is exposed to force downwards with a swivel movement according to the depiction in FIG. 2g, as indicated by reference numeral 33. As a result the guide peg 12 is moved along the second course section 19 and the third course section 20 in the direction of the fourth course section 21 in order to perform the movement again on a further swivel movement.

Figure 3A:
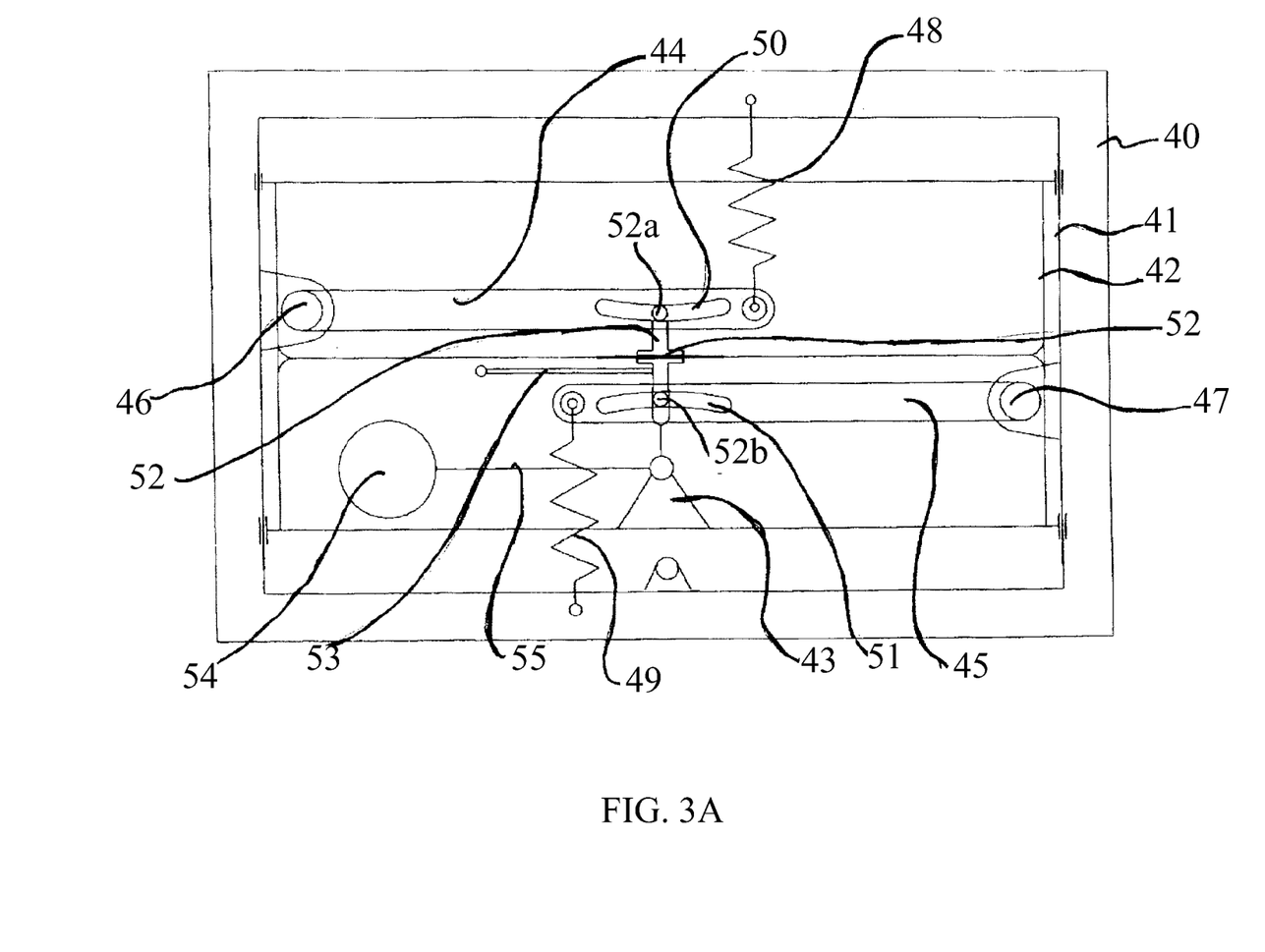
FIGS. 3a, 3b in a diagrammatic depiction, a top view of a horizontally acting spring-mounted vibration system according to a second embodiment of the invention.
Figure 3B:
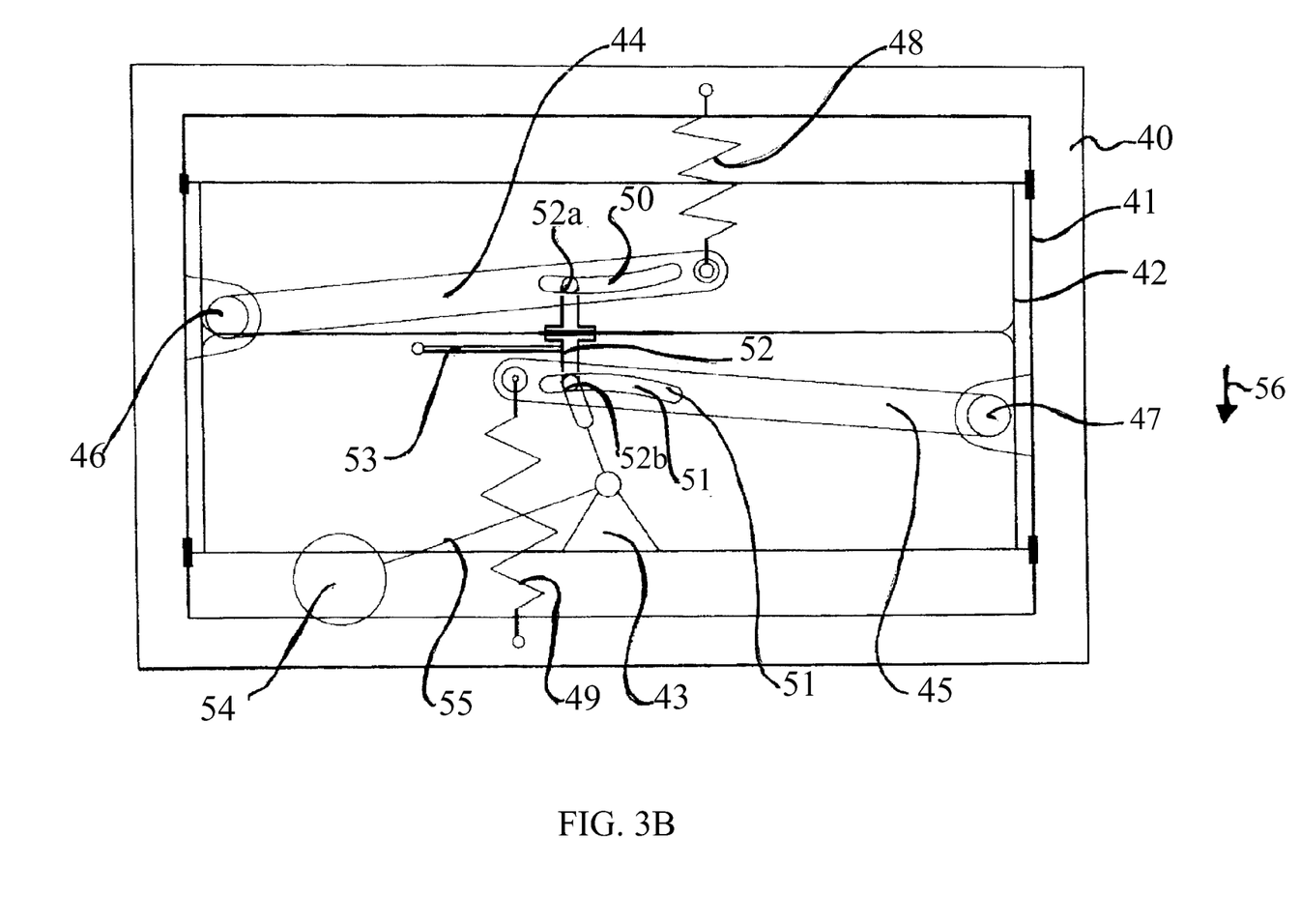

FIG. 3a shows in diagrammatic depiction a top view of a horizontally oriented spring-mounted vibration system as can be used for example for driver's cabs or vehicle seats. According to the depiction, this spring-mounted vibration system is in non-deflected state. In FIG. 3b however the spring-mounted system is shown in deflected state.

A spring-mounted part 42, for example a body frame, can be moved sideways in relation to a frame 40, 41, as shown in FIG. 3b, by an upward directed displacement of the spring-mounted part 42 in relation to parts 40, 41. Such a relative shift however takes place as priority in that the frame parts 40, 41 are moved sideways along arrow 56, i.e. can be pushed down as shown in FIG. 3b.

A connection with a guide peg 52b is arranged swivellably at a hinge point 43 next to an inertia mass 54 that is attached to an inertia lever arm 55.

Two lever arms 44 and 45 are mounted swivellable about two swivel points 46, 47 and spring-loaded by means of two springs 48, 49 in their swivel direction in relation to the frame 40, 41.

Two travel linkages with linkage paths 50, 51 are formed curved and have two guide pegs 52a, 52b which are arranged displaceably in these travel paths.

A guide rail 53 is arranged to move a connecting element 52, that is arranged between the two guide pegs 52a and 52b, in the x-direction i.e. the horizontal direction.

A comparison of the two depictions given in FIGS. 3a and 3b shows that on a deflection or vibration movement of the frame parts and where applicable body parts, at the same time the inertia element 54 is deflected. As a result, partly caused by the swivel movement of arms 44 and 45 which can be swivelled because of the vibration movement of the entire vibration system, the connecting element 52 is moved to the left. This leads to the guide pegs 52a and 52b being moved to the left along the curved linkage path and as a result in mutual dependency the swivel movements of the lever lead to a spring loading of those of the spring elements 48, 49. As a result there is a vibration reduction of the entire vibration system.

Figure 6:
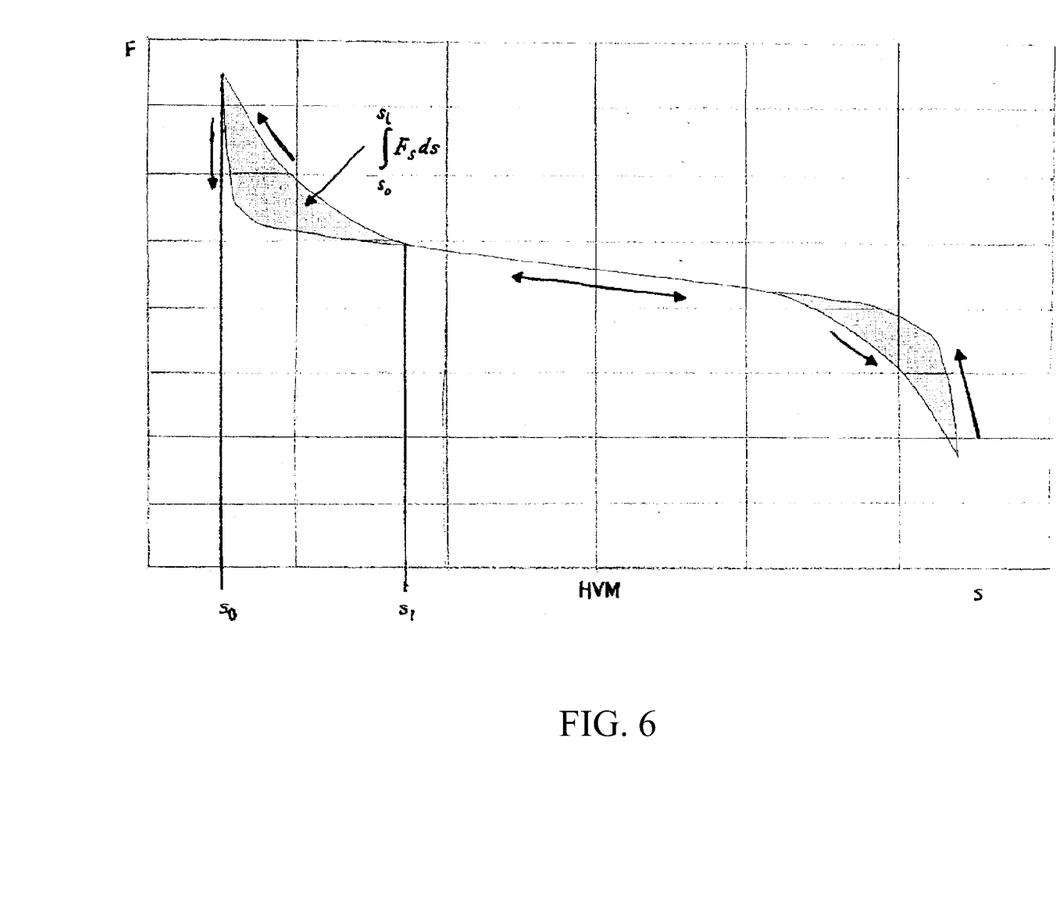
FIG. 6 in a force-travel diagram, the force-travel curve of a spring-mounted vibration system according to the first and second embodiments of the invention.

FIG. 6 shows a force-travel diagram with the force-travel curve of the vibration systems according to the first and second embodiments. By means of the travel linkages shown and the co-operating guide pegs and spring elements and lever arms, the spring kinematics of the entire spring-mounted vibration system are changed over the entire spring travel of the vibration movement so that a desired spring curve according to FIG. 6 is achieved. The spring curve changes during the vibration movement such that it has a relatively slight gradient at a height adjustment centre (HV centre). In the spring end positions, the spring curve is changed so that it has a relatively steep gradient. This constitutes a so-called end position springing. The end position springing is designed so that a high kinetic energy is damped gently. The resulting high tension or spring energy with regard to the entire vibration system, on a change of direction of the relative movement by switching the spring constants of the springing, is extracted from the vibration or springing system. This energy extraction leads to a lower vibration amplitude and hence better comfort values (SEAT value). This principle can be used for both mechanical and pneumatic seat systems.

Figure 4:
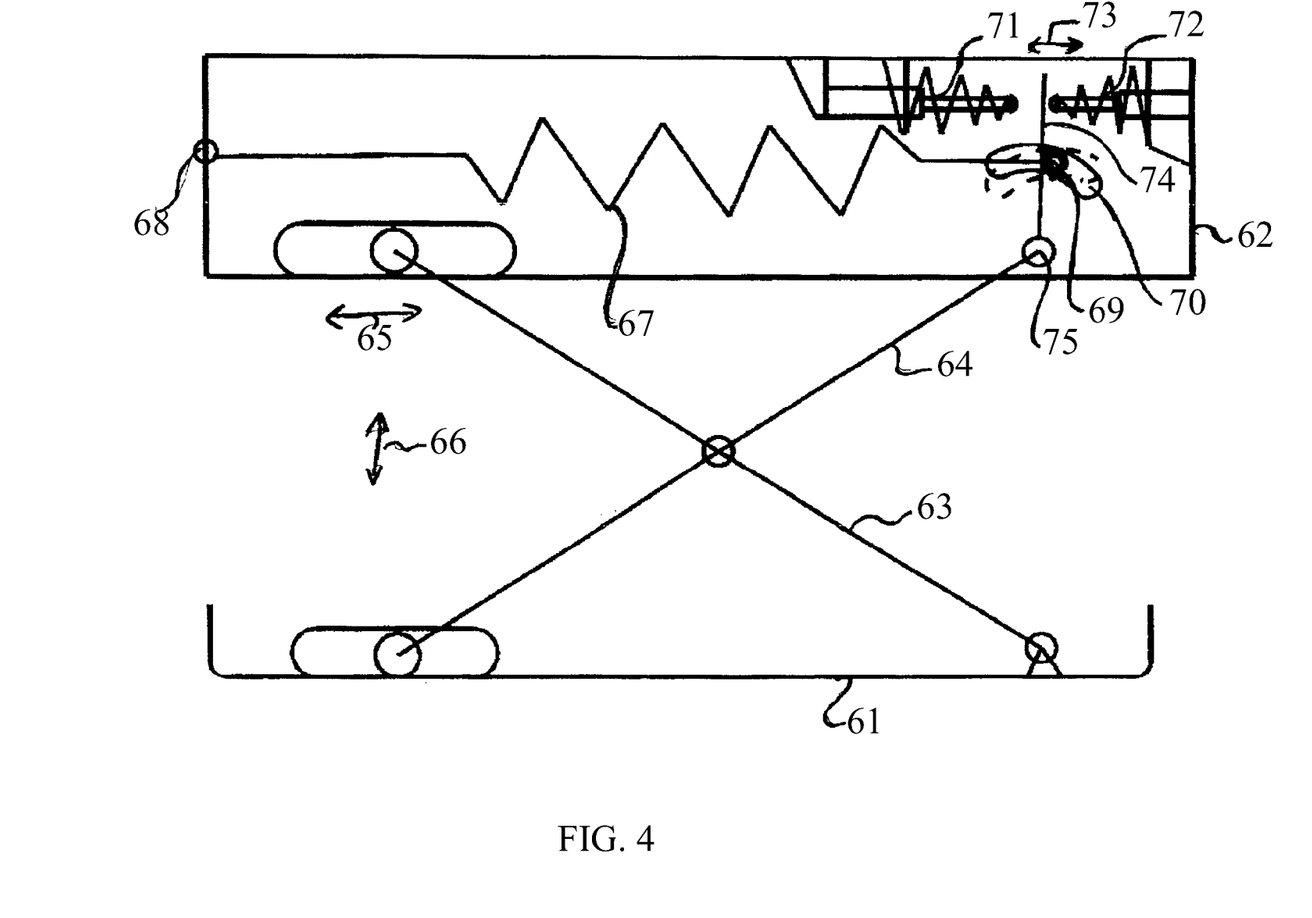
FIG. 4 in a diagrammatic side view, a vertically acting spring-mounted vibration system according to a third embodiment of the invention.

FIG. 4 shows a further spring-mounted vibration system according to a third embodiment of the invention which can vibrate in the vertical direction along reference numeral 66. Again scissor arms 63, 64 are shown between a spring-mounted lower part 61 and a spring-mounted upper part 62 such as a substructure of a vehicle seat. The swivelling of the scissor arms 63, 64 leads to a shift of the rollers along direction 65.

A spring element 67 is arranged with one end 68 on the upper spring-mounted part and with a further end 69 arranged by means of guide element inside a curved travel linkage 70. The travel linkage 70 is also arranged inside or connected with the upper spring-mounted part 62.

A lever arm or swivel arm 74 is mounted swivellably about a rotation point 75 and connected with the scissor arm 64.

Two damping or springing elements 71 and 72 are arranged on the left and right sides of the swivel arm 74 and on a swivel movement 73 of the lever arm 74 can lead to a damping of the swivel movement 73 and hence a vibration reduction.

According to FIG. 5 again a spring-mounted vibration system is shown which can be subjected to vibration in the horizontal direction. Again a top view is shown in simplified diagrammatic view. A frame 80, 81 can be moved against a further spring-mounted part 82, whereby two lever arms 84, 85 attached swivellably to swivel points 86, 87 can be deflected. Essentially the function of the vibration system given in FIG. 5 is the same as in the version given in FIGS. 3a and 3b, however without inertia element.

Figure 5:
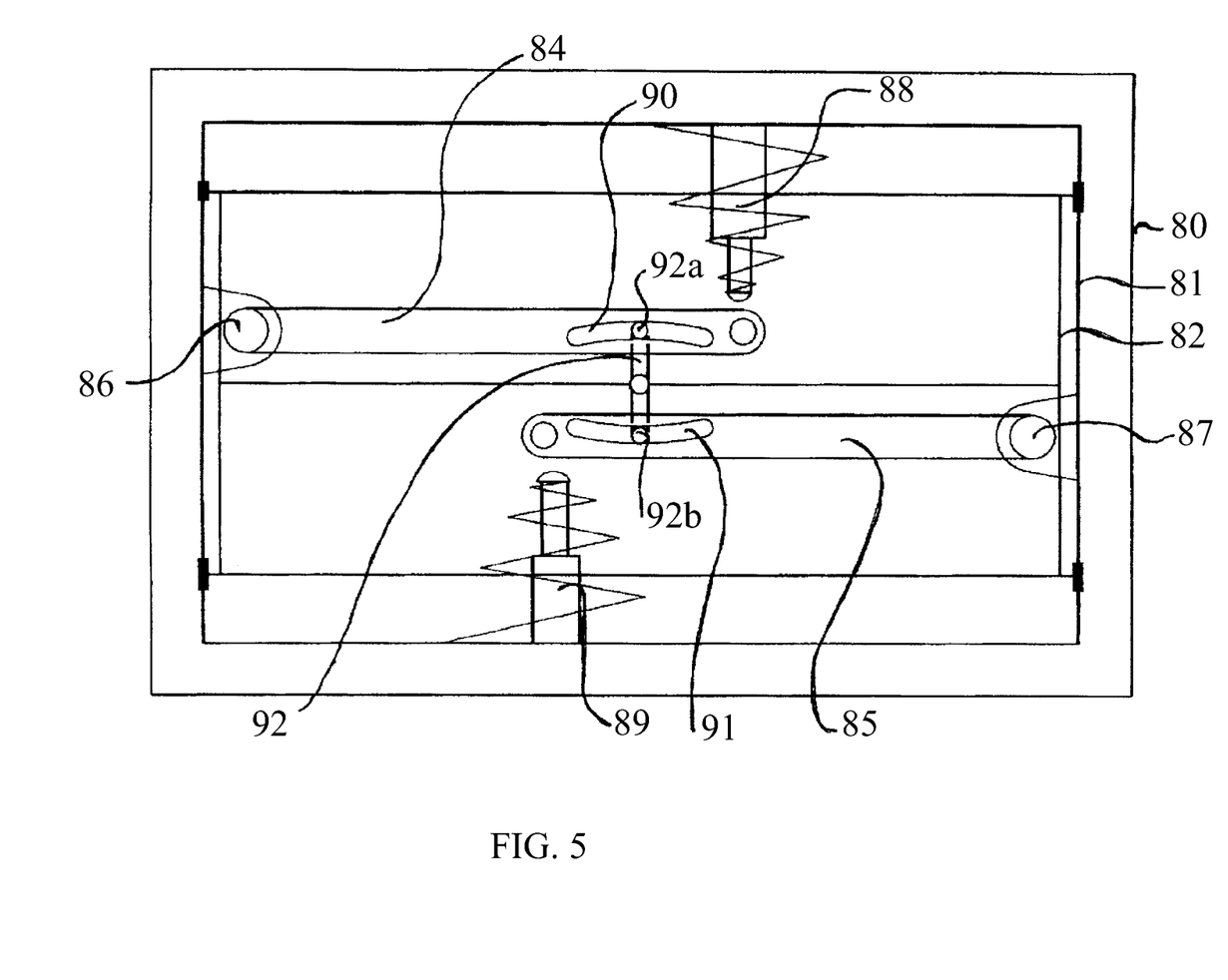
FIG. 5 in a top view, a horizontally acting spring-mounted vibration system according to a fourth embodiment of the invention.

The damper curves of the fourth embodiment shown in FIG. 5 preferably includes the following:

On compression of the system (to the left or right in the image plane), the dampers or damper elements absorb a low amount of work or energy, i.e. are easy to move.

On compression of the system the kinetic energy of the sprung mass is largely absorbed by the spring-mounted elements (end position springing).

On rebound, the damping elements absorb a high amount of work or energy i.e. are difficult to move. On rebound of the system (towards the centre in the image plane), the damping elements absorb a high amount of work or energy so that the stored spring energy is not transferred to the sprung mass again as kinetic energy but absorbed by the damping element.

On deflection or swivel, the lever arms 84, 85 are damped in their swivel movement by the damper elements 88, 89. This leads to a vibration reduction of the entire vibration system. At the same time the guide pegs 92*a* and 92*b* move to the left or right within the curved travel linkages 90, 91 in order to obtain a mutual dependency of the swivel movements of the lever arms 84, 85. For this the connecting element 92 is also moved to the left or right.

Figure 7:
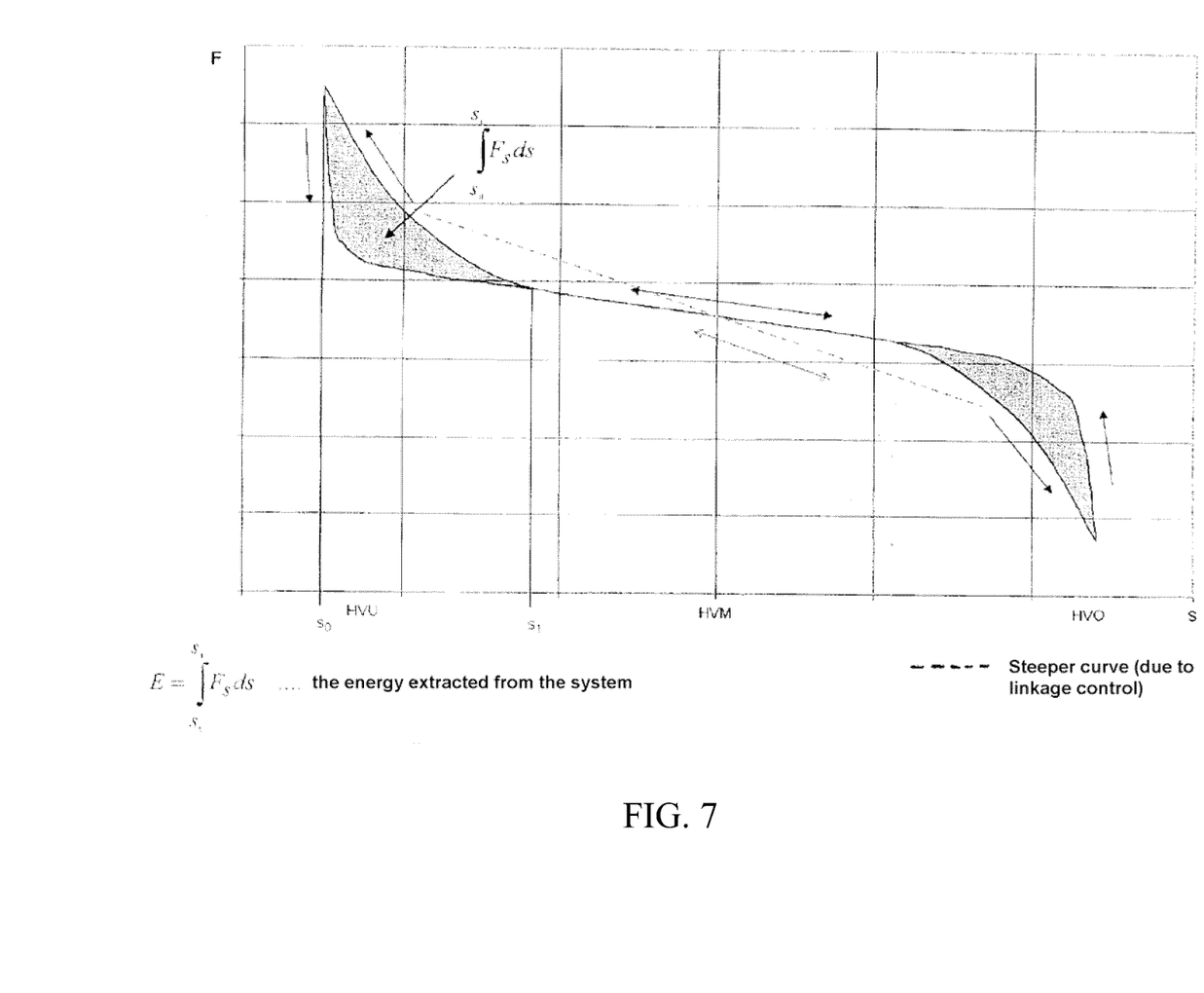
FIG. 7 in a force-travel diagram, the force-travel curve of a spring-mounted vibration system according to the third and fourth embodiments of the invention.

FIG. 7 shows in a force-travel diagram the force-travel curve of the vibration systems according to the third embodiment. The control system interaction comprising the travel linkage, lever arm, spring or springing elements and damping elements, uses the relative movement between the one spring-mounted part and the other spring-mounted part to change the vibration springing properties. By means of the additional arrangement of a spring element or damper element, the vibration springing properties are changed over the entire spring travel of the vibration system so that a desired force-travel curve according to FIG. 7 is achieved. On compression, in the area of the end position a high gradient rise in the spring curve occurs. On rebound from the end position area, the curve describes a linear course according to the diagram in FIG. 7. On swinging back from the end position area with high speed i.e. with high kinetic energy, the end position springing cannot transfer its stored energy to the system because of the high damper force. On slow rebound from the end position area, i.e. at low speed and low kinetic energy, however, the end position springing moves the scissor system comprising the scissor arms in the direction of the centre position. Any state between the two extreme situations described can be set with corresponding operating states.

The energy extraction caused by the switching of the spring curves as shown in FIG. 7 leads to a reduced vibration amplitude and hence to better comfort value (SEAT value).

This principle can again be used for both mechanical and pneumatic seat systems i.e. for spring or bellows foot shifts.

All features disclosed in the application documents are claimed as essential according to the invention insofar as they are novel individually or in combination in relation to the prior art.

The embodiments of the invention in which an exclusive property or privilege is claimed are defined as follows:

1. A spring-mounted vibration system for reducing vibration, the system comprising:
    a lower portion having a guide;
    an upper portion comprising
        a first guide; and
        a second guide;
    a first scissor arm having a first end swivelly mounted to the lower portion and a second end slideably mounted to the first guide of the upper portion;
    a second scissor arm having a first end swivelly mounted to a first location in the upper portion and a second end slideably mounted to the guide of the lower portion;
    a lever arm swivelly mounted at a first end to the first location in the upper portion and slideably received to the second guide;
    at least one damping element; and
    a spring element having a first end mounted to the upper portion and a second end mounted to the lever arm in the second guide,
    wherein a second end of the lever arm is located adjacent to the at least one damping element,
    wherein the lever arm is configured to receive vibrations from the second scissor arm via the first location.

2. The system of claim 1, wherein the second guide is curved.

3. The system of claim 2, wherein the lever arm is spring-loaded by the spring element.

4. The system of claim 3, wherein the at least one damping element is configured to reduce swivel movements of the lever arm.

5. The system of claim 4, wherein the at least one damping element comprises two damping elements located on opposing sides of the lever arm.

6. The system of claim 1, wherein the lever arm is slideably received at a middle section of the lever arm to the second guide.

* * * * *